July 9, 1963

I. J. MARTIN ET AL 3,096,653

SAMPLING DEVICE

Filed Sept. 30, 1960

INVENTORS.
Irvin J. Martin
Robert A. Stowe
Leslie G. Meverden
BY
ATTORNEY

United States Patent Office 3,096,653
Patented July 9, 1963

3,096,653
SAMPLING DEVICE
Irvin J. Martin, Robert A. Stowe, and Leslie G. Meverden, all of Ludington, Mich., assignors to The Dow Chemical Company, Midland, Mich., a corporation of Delaware
Filed Sept. 30, 1960, Ser. No. 59,747
4 Claims. (Cl. 73—422)

This invention relates to sampling device, and more particularly, it is directed to an apparatus which is an especially useful accessory to chromatographic analysis systems.

Instruments which analyze fluids by means of chromatography usually require that a fluid sample undergoing investigation be introduced into a fluid stream which performs a function of a carrier conveying the sample into and through the instrument. For instance, in gas-liquid chromatographic analysis a carrier gas, such as nitrogen or helium, is generally passed continuously through the instrument and a sample of given volume of a gas to be analyzed is injected into the carrier stream. The injected gas sample is carried through the partition column where the different constituents of the sample are segregated and later eluted from the column. The analysis is achieved by detecting the sequence in which the components of the sample mixture emerge from the partition column. Generally, the detection is effected by passing the effluent including the carrier gas from the partition column through a sensitive device which measures certain physical properties of the gas, such as the thermal conductivity. Thus as the different constituents are eluted from the partition column the components and the amount of each can be determined by the change in the thermal conductivity of the gases as they pass through a conductivity cell.

Since a small sample is used, it is essential that the sample be free of contamination. A very small amount of a contaminant may prevent sharp separations or interfere with the physical properties being tested such that accurate determinations cannot be made.

Often a process is monitored by analysis of a particular effluent stream coming from the process. Periodical checks or analysis of the stream may be made. Also, at times it is desirable to obtain a composite sample of the effluent covering a given period of operation. Thus an apparatus or device by which a periodic or composite sample may be obtained and be injected into a carrier gas stream of a chromatographic column without contamination is greatly desirable.

It is therefore an object of this invention to provide a sampling device which will meet the requirements set forth above.

With the apparatus of the invention, a fluid sample of predetermined volume may be withdrawn from a process stream and injected into the carrier stream of a chromatographic column without contamination by the surrounding atmosphere. A composite sample over a given period of time may be easily obtained with the device. The apparatus herein provided also is readily adaptable for use in conjunction with fluid analysis systems which are and may be automatically actuated to select periodic or composite samples for analysis at regular cyclic intervals.

The invention itself as to the objects and advantages and mode of operation, may be better understood by referring to the following description taken in connection with the drawings, in which.

Figure 1:
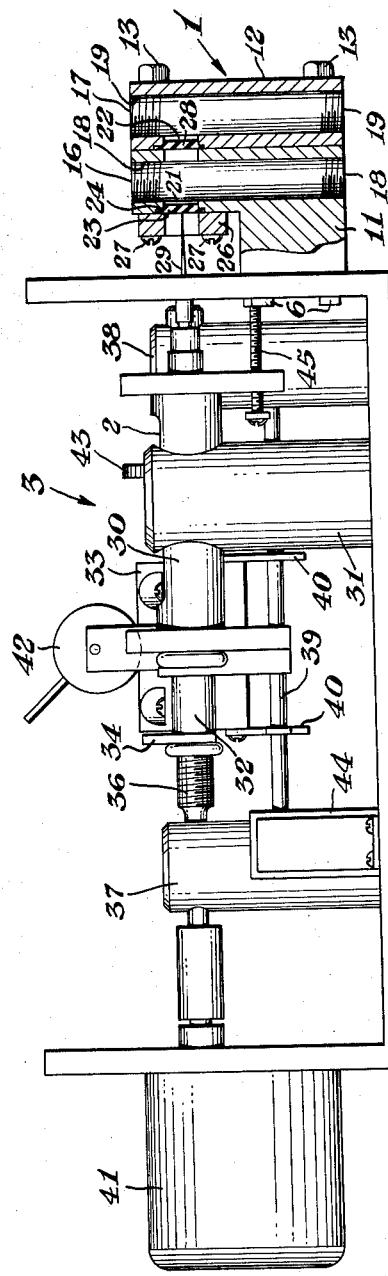
FIGURE 1 is a view of a device embodying the invention equipped with means for obtaining composite samples automatically.

In FIGURE 1 the embodiment of the device illustrated comprises a sampling block 1, a syringe 2 supported and automatically operated by mechanical means generally shown as 3, and a base 4.

The sampling block is an L shaped piece rigidly attached to base 4 by screws 6. While other means may be used to attach the sampling block to the base, it is generally preferred to bolt the block to the base so that the block may be removed and replaced if desired.

The block is made of two sections 11 and 12, respectively, which are held together by screws 13. A passageway 16 and 17, respectively, extends through each of the sections. At the ends of the passageways means are provided, such as threads 18 and 19, respectively, for connecting the passageways to pipe lines or other conduits. Through the outer wall of section 11 of the sampling block an aperture 21 communicates with passageway 16. A second aperture 22, in axial alignment with the first, is provided through the inner wall of sections 11 and 12 dividing the passageways. In aperture 21, a septum 23 of an elastomeric material, such as rubber, is inserted. As shown, aperture 21 is enlarged at end 24 by counterboring to provide a seat and means of holding the septum in the aperture. The septum is made with one end enlarged which seats in the counterbore. An annular plate 26 is attached to the sampling body as by screws 27 holding the septum in place and providing a tight seal. The aperture of the annular plate is in axial alignment with the apertures in the sampling block.

A septum 28 of elastomeric material is also inserted in the aperture 22 between the passageways. The aperture in the wall of section 12, distant to passageway 17, is countersunk to receive septum 28 which is made with one enlarged end similar to septum 23. When section 12 of the sampling block is bolted to section 11, the enlarged diameter portion of the septum seats against section 11 forming a fluid tight seal and holding the septum in the aperture. It is apparent that other means may be used of seating the septums in the apertures to provide a gas tight or fluid tight seal. The septums may be made attached to a metal threaded ring and the apertures threaded to receive the ring. When this method is used and the sampling block is made of one piece instead of the two sections as shown in the drawing, aperture 21 is made larger than aperture 22 so that the septum 28 can be inserted into the inner wall aperture by passing the septum with the ring through the larger aperture 21.

The syringe support mechanism comprises a syringe holder 30 which is movably supported by the holder guide 31. The holder guide is rigidly attached to base 4. Syringe 2 is positioned in the syringe holder with needle 29 of the syringe being directed towards the sampling block and with the point of the needle being in axial alignment with the apertures and the septums. Plunger 32 of the syringe extends from the other end and is attached to a split nut 33 by means of a yolk 34. The split nut is positioned on the screw shaft 36 operating between two bearings 37 and 38, respectively, attached to the base. The split nut is also movably attached to guide bar 39 by flanges 40 at each end of the nut so that it does not rotate. The screw shaft is driven by a variable speed motor 41 so that the rate of rotation of the screw shaft can be controlled. The split nut is equipped with an eccentric cam 42 which compresses the split nut together when actuated to engage the nut with the threads of the screw shaft and result in the movement of the nut by the rotation of the shaft. Upon movement of the split nut, yolk 34 actuates the plunger 32 of the syringe. The apparatus is equipped with a stop collar 43 which limits the travel of the split nut in one direction. A micro switch 44 located at the other end limits the distance that the plunger of the syringe may travel. Bolt 45 limits the backward and forward travel of the syringe holder.

In operation of the apparatus, the syringe is placed in the syringe holder with the point of the needle of the syringe being a short distance from the septum 23. The sampler is connected to the proper conduits or pipe. For example, the effluent from a particular process from which a sample is desired is connected by means of threads 18 to passageway 16. The carrier gas going to the chromatography partition column is passed through passage 17 by attaching the appropriate lines to passageway 17. Thus, in operation the gas coming from the process from which a sample is desired is continually passing through passageway 16, while the carrier gas for the chromatography partition column is continually passing through passageway 17. When sampling is desired, the syringe holder with the syringe is moved forward in the holder guide 31 so that the needle penetrates septum 23 and the end of the needle is located in passageway 16 which contains the process effluent gas. Bolt 45 is then adjusted to limit the travel of the syringe holder so that the needle would not be extracted from passageway 16 by the movement of the holder. If a periodic sample is desired, the plunger 32 of the syringe may be operated by hand or automatically to draw in a required size sample by the movement of the plunger. When the desired sample is drawn into the syringe, the syringe and the holder is thrust further in its guide until the point of the needle penetrates through septum 28 and the needle point enters in passage 17. The plunger of the syringe is then pushed in to discharge the sample into the carrier gas stream. A composite sample may be taken automatically, if desired. The syringe is positioned so that the point of the needle is in the passageway 16 or the process stream. Motor 41 is started to drive the screw shaft and the cam is positioned to engage the split nut into the threads of the shaft. By varying the speed of the motor, the speed at which the split nut moves may be adjusted so that a composite sample over any period of time may be taken. At the end of the set time the travel of the plunger is stopped by contacting the micro switch 44. At that time the split nut may be released and the mechanism operated by hand to move the syringe and its holder forward to discharge the sample into the carrier gas stream. Also the apparatus may be made automatic so that when the micro switch 44 is actuated it would not stop the motor but actuate an automatic control (not shown) in the syringe holder so that it would automatically be shoved forward to have the needle penetrate the septum 28 and then the plunger driven forward to discharge the gas sample into the carrier gas stream. Thus, by this attachment it is possible to adjust the apparatus so that a composite stream for a given length of time is taken and then automatically analyzed. After the plunger gas has been discharged into the carrier stream, the cycle can be repeated. The sample once taken is not contaminated with the surrounding atmosphere or other contaminants. The tip of the needle exposed to the process gas is inserted through the septum directly into the carrier gas stream. In the prior art apparatus where syringes are used, generally the needle is inserted through a rubber tubing and a sample withdrawn. The needle is then withdrawn from the rubber tubing containing the process effluent and inserted in a second tubing having the carrier gas into which the gas sample is injected. In this procedure the needle is contaminated with surrounding atmosphere which may interfere with the analysis. By use of the sampler of this invention, this contamination is avoided. Once a sample is taken the tip of the needle is not removed from the process effluent before being discharged into the carrier stream.

While the above discussion has been limited mainly to vapor phase sampling for gas-liquid chromatography analysis it is apparent that the sampling device will work as well for liquid phase sampling or any fluid sampling process in which it is desired to inject a sample from one stream into another. The apparatus is especially useful where it is desirable to take a composite sample. In most processes a certain amount of fluctuation in conditions and effluent composition is obtained. Thus, this apparatus may be very conveniently used to obtain a composite sample over a given length of time which may be analyzed to determine the average product manufactured or obtained for the given time.

Figure 2:
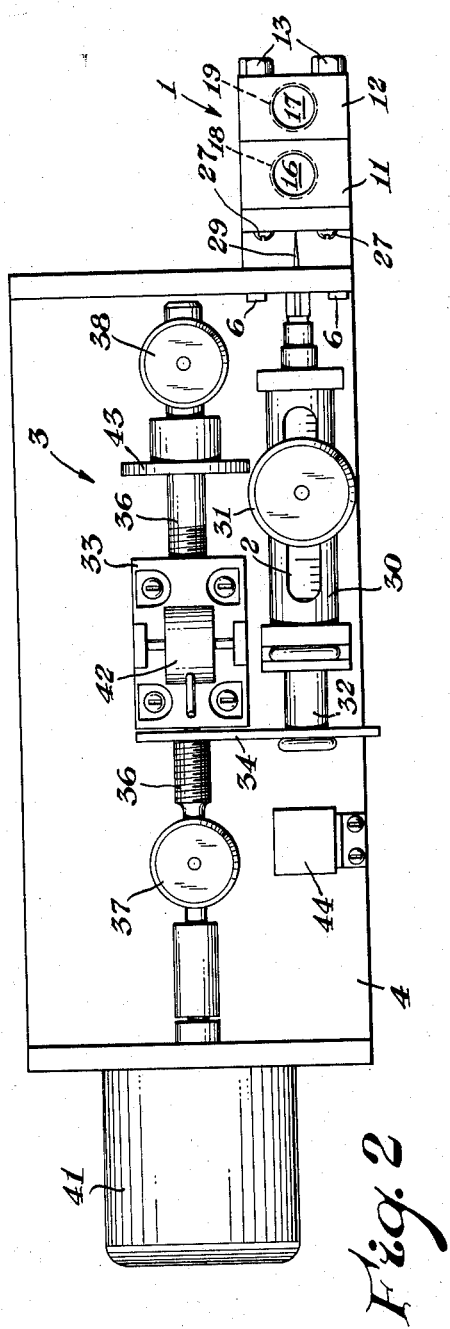
FIGURE 2 is a top view of the device shown in FIGURE 1.

It is apparent that the apparatus as shown in FIGURES 1 and 2 may be modified without departing from the invention. The sampling block may be made in a different shape and the apertures to the passageways obtained by means of a third passageway at an angle with other two passageways. If an automatic sampling device is not desired, the syringe may be supported and operated by hand. Also different means of automatic control and travel may be used.

What is claimed is:

1. A sampling device comprising a sampling block having two passageways extending through said block with an aperture in the outer wall communicating with one passageway and a second aperture through the inner wall dividing the passageways, said apertures being in axial alignment and being closed with an elastomeric material, a syringe having a needle at one end and a plunger at the other, means for supporting the syringe adjacent to the sampling block with the point of the needle of the syringe positioned in axial alignment with said apertures, means of moving the syringe forward and backward to thereby insert and withdraw the point of the needle through the elastomeric material in said apertures, and means to operate the plunger of the said syringe.

2. A sampling device comprising a sampling block having two parallel passageways extending through said block with an aperture through the outer wall communicating with one passageway and a second aperture through an inner wall dividing the second passageway, a rubber septum inserted in each of said apertures forming a fluid type seal, a syringe having a needle at one end and a plunger at the other, means of supporting the syringe adjacent to the sampling block with the point of the needle of the syringe positioned in axial alignment with said apertures and with said rubber septums in the apertures, means of moving the syringe forward and backward to thereby insert and withdraw the point of a needle through said rubber septums, and means to operate the plunger of said syringe.

3. A sampling device comprising a block having one passageway extending through said block and a cross-passageway extending through said block at an angle and communicating with first said passageway, a second block having a passageway extending through said second block with an aperture in the outer wall communicating with the passageway, said second block being attached to said first block with the aperture of the second block being in axial alignment with the cross-passageway of said first block, a septum of elastomeric material inserted between said blocks at the aperture and the cross-passageway to form a fluid type seal between the passageways in said first and second blocks, a second septum of elastomeric material being inserted in the cross-passageway of first said block at a point distant from the second block to form a fluid type seal in the cross-passageway, a syringe having a needle at one end and a plunger at the other positioned in axial alignment with said cross-passageway and aperture of said blocks, means of moving the syringe forward and backward to thereby insert the point of the needle through the septums in said cross-passageway and between said blocks, and means to operate the plunger of said syringe.

4. A sampling device comprising a sampling block having two passageways extending through said block with at least a portion of the inner wall between the passages being of elastomeric material and with at least a portion of the outer wall of the block in alignment with the elastomeric portion of the inner wall being of elastomeric material, a syringe having a needle at one end and a plunger at the other, means of supporting the syringe adjacent to the sampling block with the point of the needle of the syringe positioned transversely to the block in alignment with the elastomeric portions of the outer and inner walls, means for moving the syringe forward and backwards to thereby insert and withdraw the point of the needle through the elastomeric portions of the outer and inner walls and means to operate the plunger of said syringe.

References Cited in the file of this patent

UNITED STATES PATENTS

| | | |
|---|---|---|
| 2,498,672 | Glass | Feb. 28, 1950 |
| 2,624,656 | Andrews | Jan. 6, 1953 |
| 2,839,152 | Tracht | June 7, 1958 |